Figure 1:
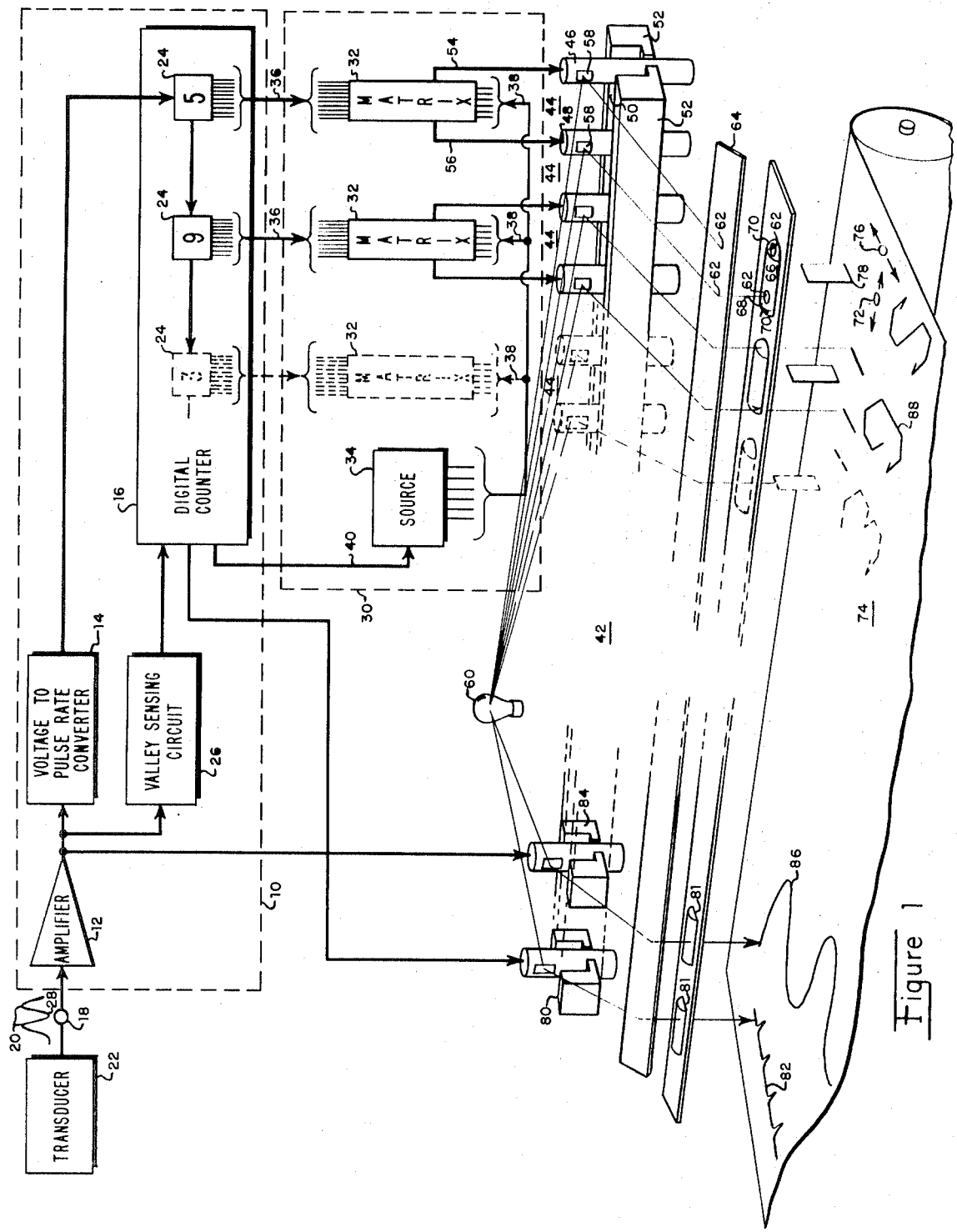

United States

[11] 3,618,121

[72] Inventor Fritz Baur
 Denver, Colo.
[21] Appl. No. 392,233
[22] Filed Aug. 26, 1964
[45] Patented Nov. 2, 1971
[73] Assignee Hewlett-Packard Company
 Palo Alto, Calif.

[54] ALPHANUMERIC PRINTER
 3 Claims, 2 Drawing Figs.
[52] U.S. Cl. .................................................. 346/109,
 350/190
[51] Int. Cl. ....................................................... G01d 9/42
[50] Field of Search ........................................... 346/109,
 108, 110; 324/77 D; 350/190

[56] References Cited
 UNITED STATES PATENTS
 3,208,075 9/1965 Casauant...................... 346/33
 Primary Examiner—Joseph W. Hartary
 Attorney—A. C. Smith ABSTRACT: This invention relates to a printing apparatus for printing a plurality of alphanumeric characters on a light-sensitive paper. A digital voltmeter and a character generator provide waveforms indicative of an input signal to a plurality of pairs of galvanometers. A pair of light beams are reflected by each pair of galvanometers onto the paper to form each character. A lens having cylindrical and hemispherical portions is provided to focus each pair of beams onto the paper.

ALPHANUMERIC PRINTER

PRINTING APPARATUS

This invention relates to printing apparatus for printing a plurality of columns of alphanumeric characters on light-sensitive paper, and particularly to a high-speed printing system for use in gas chromatography.

The use of the gas chromatographic technique for quantitative analysis of mixtures requires precise measurement of chromatographic peak size. For the analysis of gases and readily vaporized liquids, calibrations based on chromatographic peak height (volts) are usually sufficient. But for the analysis of liquid-phase samples, where sample size reproducibility is much more difficult to achieve than with gases, calibrations are usually based on chromatographic peak area (volt-second) measurements.

Several types of integrators have been developed and used to measure chromatographic peak area. Typically, these integrators either record their results in the form of pips on the margin of a recorder chart or produce a digital readout of their results on a counter. The maximum counting rate of the pip-recording method is too slow to permit measurement and recordation of small chromatographic peak areas with precision. In addition the analyst is left with the tedious job of counting the pips associated with selected chromatographic peaks to determine the area thereof. The digital counter readout method provides a high-speed counting rate, but requires the constant observation of the analyst who must record the appropriate readings himself. Thus, a high-speed printing system for printing a numerical indication of chromatographic peak area would be useful to minimize the inaccuracies and difficulties associated with these past methods of chromatographic peak area measurement and recordation.

Accordingly, it is the principal object of this invention to provide a high-speed printing system for printing a numerical indication of chromatographic peak area.

Optical galvanometer-type recorders have been developed which are sufficiently fast for use in a gas chromatograph printing system. However, there are generally several deficiencies associated with such recorders. These deficiencies include poor contrast between recorded trace and its background and unequal line width (for example, the vertical lines of the trace are much wider than the horizontal lines).

Accordingly, another object of this invention is to provide a high-speed printing apparatus having an improved optical system for printing distinct characters of uniform line width with light.

In accordance with the illustrated embodiment of this invention there is provided a high-speed printing system comprising an integrating digital voltmeter for integrating to determine chromatographic peak area, an integral in volt-seconds, and for producing a digital output signal indicating the value of the integral. A character generator is connected to the integrating digital voltmeter for translating the digital output signal produced thereby into a selected set of character forming pulses indicating the value of the integral. And a multiple channel printer is connected to the character generator for printing a numerical indication of the value of the integral in response to the selected set of character forming pulses generated thereby, The multiple channel printer includes an improved optical system for focusing spots of light projected from a plurality of light-deflecting galvanometers on a light-sensitive recording surface such that characters of uniform line width are formed in response to the selected set of character forming pulses from the character generator.

Figure 2:
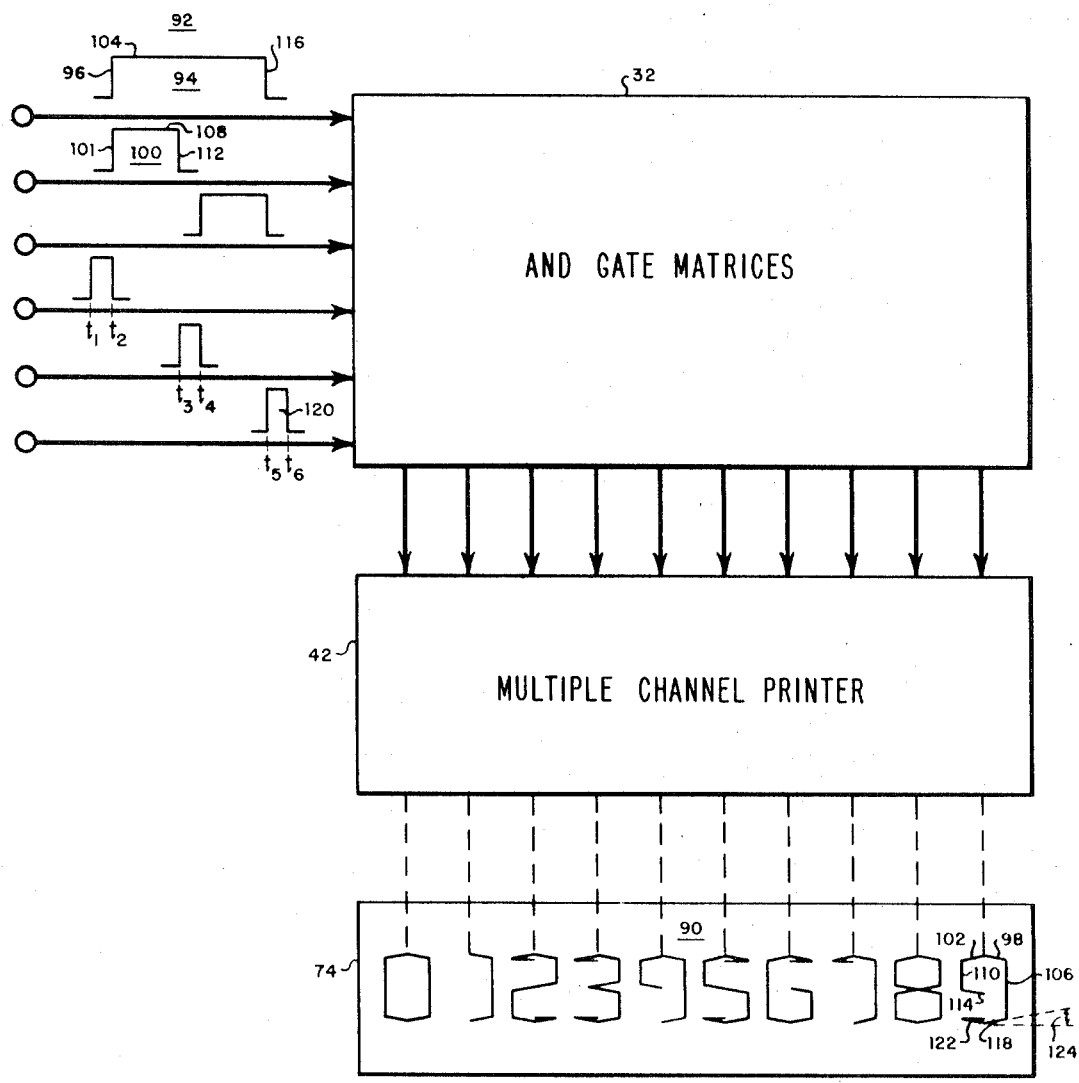

Other and incidental objects of this invention will be apparent from a reading of this specification and inspection of the accompanying drawing in which:

FIG. 1 is a schematic diagram of a high-speed printing system according to this invention; and FIG. 2 illustrates a set of numbers synthesized from a set of character forming pulses and printed by the high speed printing system of FIG. 1.

Referring to FIG. 1, there is shown an integrating digital voltmeter 10 comprising a DC amplifier 12, a voltage-to-pulse rate converter 14 (commonly referred to as a voltage-to-frequency converter), and a digital counter 16 serially connected to input terminal 18. An analog voltage signal, for example, a series of chromatographic peaks 20 generated by transducer 22 and applied to input terminal 18 is amplified by DC amplifier 12 and applied to voltage-to-pulse rate converter 14 where it is converted into a train of pulses. This train of pulses is counted by digital counter 16 thereby producing a digital output signal indicating the value of the chromatographic peak area, an integral in volt-seconds, at $n$ number of decade counters 24 shown with their numerical display in digital counter 16. Voltage-to-pulse rate converter 14 and digital counter 16, therefore, serve as an integrator for integrating to determine the integral in volt-seconds which represents the chromatographic peak area. A valley sensing circuit 26 is connected in shunt with the voltage-to-pulse rate converter 14 for triggering the signal gate (not shown) in digital counter 16 whenever the amplified analog voltage signal applied to voltage-to-pulse rate converter 14 passes through a valley 28, as between adjacent chromatographic peaks 20.

The integrating digital voltmeter 10 might be adequately replaced by other devices. For example, an oscillating quartz-crystal covered with a retentive substance has recently been described in the gas chromatography literature. The frequency of this device is a function of the gas composition of the gas directed over its surface. Therefore, it might be used with the digital counter 16 in lieu of amplifier 12 and voltage-to-pulse rate converter 14. However, the valley sensing function might then require a digital-to-analog converter or some other rate detector.

The character generator 30 comprises a plurality of and gate matrices 32 equal to the $n$ number of decade counters 24 shown in digital counter 16 and a pulse generator 34 for generating a set of character-forming pulses. Matrices 32 are connected in parallel, decimal connection to decade counters 24, thereby forming a plurality of character selection inputs 36 to character generator 30. Each character selection input 36 represents 10 lines connecting a decade counter 24 to a matrix 32. Thus, successive matrices 32 correspond to the successive powers of 10 represented by the successive decade counters 24. Additionally, matrices 32 are connected in parallel to the output of pulse generator 34, thereby providing character-forming inputs 38 to the parallel-connected matrices 32. Each character-forming input 38 represents six lines connecting the output of pulse generator 38 to matrices 32.

The trigger input 40 of pulse generator 34 is connected to the signal gate (not shown) in digital counter 16. Therefore, triggering of the signal gate by valley sensing circuit 26 applies a print command signal to pulse generator 34 in response to which pulse generator 34 generates a set of character forming pulses. The set of character-forming pulses includes six constant amplitude pulses coded with respect to pulses or combinations thereof may be used to synthesize alphanumeric characters. See FIG. 2 and the description thereof.

The set of character-forming pulses generated by pulse generator 34 is applied to matrices 32 at character-forming inputs 38 in coincidence with the digital output signal produced by digital counter 16 and applied thereby to matrices 32 at character selection inputs 36. Matrices 32 select appropriate ones of the character-forming pulses in response to the coincidence therewith of the digital output signal from digital counter 16 and apply them to a multiple channel printer 42 for synthesizing a numerical indication of the integral in volt-seconds indicated by the digital output signal from digital counter 16.

Multiple channel printer 42 includes a separate channel 44 for each of the matrices 32 such that successive channels 44 print numbers corresponding to the successive powers of 10 represented by the successive decade counters 24. Because each channel 44 is identical to the others, only one will be described in detail and furnished with reference numerals. Channels 44 include a pair of light-deflecting mirror galvanometers 46 and 48 arranged in a common linear gap 50 between the north and south poles of a permanent magnet 52. Mirror galvanometers 46 and 48 are connected to the output terminals 54 and 56 of the corresponding matrix 32 to receive the selected character-forming pulses therefrom. The mirrors 58 of mirror galvanometers 46 and 48 are arranged along a line exterior to the linear gap 50 and are illuminated by a light source 60. Light source 60 causes each of the mirror galvanometers 46 and 48 to project a spot of light 62 onto the surface of a plane mirror 64 from where it is reflected to a lens 66.

Lens 66 may be molded from acrylic resin and comprises a cylindrical portion 68 terminating at either end in a hemispherical portion 70. The cylindrical portion 68 has a longitudinal axis which is equal to the width of the widest number to be printed. Cylindrical portion 68 focuses the spot of light 62 incident thereon on an oblong area 72 of a light-sensitive recording surface 74 for forming a horizontal line thereof as the spot of light 62 is deflected along the longitudinal axis of cylindrical portion 68. A hemispherical portion 70 focuses the spot of light 62 incident thereon on a circular area 76 of the light-sensitive recording surface 74. The light-sensitive recording surface 74 is moving in a direction normal to the longitudinal axis of lens 66. This causes the spot of light focused by a hemispherical portion 70 on the light sensitive recording surface 74 to form a vertical line thereon.

Vertical and horizontal lines of substantially uniform width are formed, because the diameter of circular area 76 is substantially equal in dimension to the minor axis of oblong area 72. Furthermore, lens 66 focuses the spots of light 62 on sufficiently small areas 72 and 76 of the recording surface 74 to permit increased light intensity, thereby providing greater contrast between the characters formed and the background.

The path of a light beam reflected from the mirror 58 of a mirror galvanometer 46 or 48 to the recording surface 74 is relatively long compared with the excursions of the light beam thereon. Thus, a light beam reflected from the mirror 58 follows substantially parallel paths regardless of its deflection. A spherical lens intersecting these parallel paths will focus any beam of light smaller than the spherical lens on the same spot regardless of where the light beam strikes the lens. Hemispherical portions 70 of lens 66 operate on this principal to stabilize the spots of light 62 when they are focused thereby on the recording surface 74 so that small zero-drifts of the mirror galvanometers 46 and 48 are canceled out.

A light baffle 78 may be used, if desired, to confine the spot of light 62 projected from mirror galvanometer 46 and reflected by plane mirror 64 to the right half of lens 66. Similarly, light baffle 78, if used, confines the spot of light 62 projected from mirror galvanometer 48 and reflected by plane mirror 64 to the left half of lens 66. Mirror galvanometers 46 and 48 cooperatively deflect the spots of light 62 to form the horizontal and vertical lines of the appropriate number in response to the character forming pulses selected in response to the character forming pulses selected by the matrix 32 which is connected to mirror galvanometers 46 and 48. If light baffle 78 is used the spots of light 62 are deflected thereon when a trace is not appropriate, as, for example, between successive digits formed in the same column. In applications where it is desirable to blank the trace between successive digits formed in the same column, but light baffles 78 are difficult to use because of the geometry of the light rays, they may be adequately replaced with polarization filters.

Each channel 44 of multiple channel printer 42 functions in the same manner as heretofore described so that the integral indicated by the digital output signal produced at digital counter 16 is printed in adjacent columns on the light-sensitive recording surface 74. Multiple channel printer 42 also includes a time-marker trace channel represented by a mirror galvanometer unit 80 which is connected directly to digital counter 16. Light source 60 causes mirror galvanometer unit 80 to project a light beam onto the surface of plane mirror 64 from which it is reflected to a conventional cylindrical lens 81. The lens 81 focuses the reflected light beam on the light sensitive recording surface 74 where it prints a time-marker trace 82 as the mirror galvanometer of unit 80 is deflected in response to impulses from digital counter 16. Multiple channel printer 42 further includes an analog trace channel represented by a mirror galvanometer unit 84 which is connected directly to the output of amplifier 12. The analog trace channel operates similarly to the time-marker trace channel, and is responsive to the analog output of amplifier 12 for printing an analog trace 86 of the chromatographic peaks 20 adjacent to the printed integrals 88.

A high-speed printing system according to this invention was built using mirror galvanometers having a response to 5000 cycles per second and requiring approximately 8/10 of a milliwatt of driving power. Ultraviolet-sensitive Kodak Linograph paper was used for the recording surface. This paper shows a visiable trace at writing speeds as high as 20,000 inches per second when illuminated by an ultrahigh-intensity mercury-vapor light source and it does not require developing or processing. The printer used had 12 channels and was, therefore, capable of printing six numbers per line. A maximum chart speed of 25 inches per second was used, thereby setting the highest attainable printing speed at 150 lines per second. Printing speeds as high as 250 lines per second are attainable with the printing system of this invention.

Referring now to FIGS. 1 and 2, there is shown a set of numbers 90, synthesized from a set of six character-forming pulses 92. For example, the number "9" is synthesized by applying pulse 94 to mirror galvanometer 46. The positive voltage rise 96 of pulse 94 deflects mirror galvanometer 46 causing it to direct a spot of light 62 away from light baffle 78 and along the right half of the cylindrical portion 68 of lens 66, whereby horizontal line 98 is formed. Simultaneously, pulse 100 is applied to mirror galvanometer 48, the positive voltage rise 101 causing it to direct a spot of light 62 away from light baffle 78 and along the left half of cylindrical portion 68, whereby horizontal line 102 is formed.

Constant voltage level 104 of pulse 94 maintains mirror galvanometer 46 at maximum deflection so that a spot of light 62 is directed continuously on the right-hemispherical portion 70 of lens 66, whereby vertical line 106 is formed (all vertical lines result from the longitudinal movement of light-sensitive recording surface 74). During this time constant voltage level 108 of pulse 100 maintains mirror galvanometer 48 at maximum deflection so that a spot of light 62 is directed continuously on the left-hemispherical portion 70, whereby vertical line 110 is formed. The negative voltage fall 112 of pulse 100 deflects the mirror galvanometer 48 so that a spot of light 62 is directed back along the left half of cylindrical portion 68 and onto light baffle 78, whereby horizontal line 114 is formed.

Negative voltage fall 116 of pulse 92 deflects mirror galvanometer 46 so that a spot of light 62 is directed back along the right half of cylindrical portion 68 and onto light baffle 78, whereby horizontal line 118 is formed. Simultaneously, pulse 120 is applied to mirror galvanometer 48 causing it to deflect so that a spot of light 62 is directed away from light baffle 78, across the left half of cylindrical portion 68, and back again to light baffle 78, whereby horizontal line 122 is formed.

The slight inclination 124 of the horizontal lines is caused by the longitudinal movement of the recording surface 74 during the deflection of the spots of light 62. For example, if the spots of light 62 are deflected at about 10 times the speed of the longitudinally moving recording surface 74, all horizontal lines would have about a 10 percent inclination. In addition all horizontal lines would receive about 10 times less light-flux than the vertical lines. However, the nonlinear sensitivity of photoemulsions tends to equalize this quite well.

Every number from zero to nine may be formed with a pair of mirror galvanometers 46 and 48. However, to print some letters, for example, "W" or "M", additional mirror galvanometers are required.

I claim:

1. A lens for focusing a spot of light on a recording surface to form thereon a character having substantially uniform line width, said lens comprising:
    a cylindrical portion for focusing said spot of light, when said spot of light is incident thereon, on an oblong area of said recording surface;
    said cylindrical portion having a longitudinal axis which is not less in dimension than the width of said character;
    said cylindrical portion being contiguously disposed between a pair of hemispherical end portions, each for focusing said spot of light, when said spot of light is incident thereon, on a circular area of said recording surface; and
    said circular area having a diameter substantially equal in dimension to the minor axis of said oblong area.

2. Printing apparatus for printing a character on a strip of recording material which is moved in a longitudinal direction past a recording line, said printing apparatus comprising:
    a light source for illuminating at least a pair of light-deflecting galvanometer elements;
    each of said galvanometer elements projecting a spot of light from said light source to a lens disposed for focusing said spot of light on a recording surface of said recording material at said recording line;
    said lens including a cylindrical portion for focusing said spots of light, when they are directed thereon, on an oblong area of said recording surface;
    said cylindrical portion having a longitudinal axis which is not less in dimension than the width of said character, whereby deflection of said spots of light therealong forms the horizontal lines of said character;
    said cylindrical portion being contiguously disposed between a pair of hemispherical end portions, each for focusing one of said spots of light, when it is directed thereon, on a circular area of said recording surface;
    said circular area having a diameter substantially equal in dimension to the minor axis of said oblong area, whereby the longitudinal movement of the recording material past said recording line forms the vertical lines of said characters with substantially the same width as said horizontal lines; and
    means for selectively deflecting said galvanometers to direct said spots of light upon the appropriate portions of said lens, whereby the horizontal and vertical lines of said character are formed.

3. Printing apparatus in which a strip of recording material is moved in a longitudinal direction past a recording line, said printing apparatus comprising:
    a pulse generator for generating a set of coded character-forming pulses;
    a signal source for generating a character-selection signal;
    a coincidence network connected to said pulse generator for receiving the character-forming pulses generated thereby and connected to said signal source for receiving the character-selection signal generated thereby;
    said coincidence network comprising a plurality of gates for electing certain ones of said character-forming pulses in response to said character-selection signal;
    means for connecting said coincidence network to a pair of light-deflecting galvanometer elements and for applying the selected character-forming pulses to said light-deflecting galvanometer elements;
    a light source for illuminating said galvanometer elements;
    said galvanometer elements being responsive to the illumination from said light source for projecting spots of light to a lens disposed for focusing said spots of light on a surface of said recording material at said recording line;
    one of said spots of light moving transverse to said longitudinal direction as each of said galvanometer elements is deflected in response to one of the selected character-forming pulses;
    said galvanometer elements being responsive to the selected character-forming pulses for deflecting said spots of light as required to print a character on the surface of said recording material; and
    baffle means disposed along the path of the light between said light source and the surface of said recording material for blanking the spots of light when they are directed onto said baffle means;
    each of said galvanometer elements being disposed such that the spot of light projected therefrom is directed onto said baffle means when the galvanometer element is not deflected in response to a character-forming pulse.

* * * * *

UNITED STATES PATENT OFFICE
CERTIFICATE OF CORRECTION

Patent No. 3,618,121　　　　　　　　Dated November 2, 1971

Inventor(s)　Fritz Baur

It is certified that error appears in the above-identified patent and that said Letters Patent are hereby corrected as shown below:

Column 1, line 62, " , " should read -- . --;

Column 2, line 35, "and" should read -- AND --; line 56, after "with respect to" insert -- pulse duration and pulse position such that selected --;

Column 3, lines 58-59, delete "in response to the character forming pulses selected" (second occurrence);

Column 6, line 15, "electing" should read -- selecting --.

Signed and sealed this 2nd day of May 1972.

(SEAL)
Attest:

EDWARD M.FLETCHER.JR.　　　　　　　ROBERT GOTTSCHALK
Attesting Officer　　　　　　　　　　Commissioner of Patents